L. F. JANKE.
FLOATING HUB METAL WHEEL.
APPLICATION FILED MAR. 8, 1922.
1,428,034.
Patented Sept. 5, 1922.
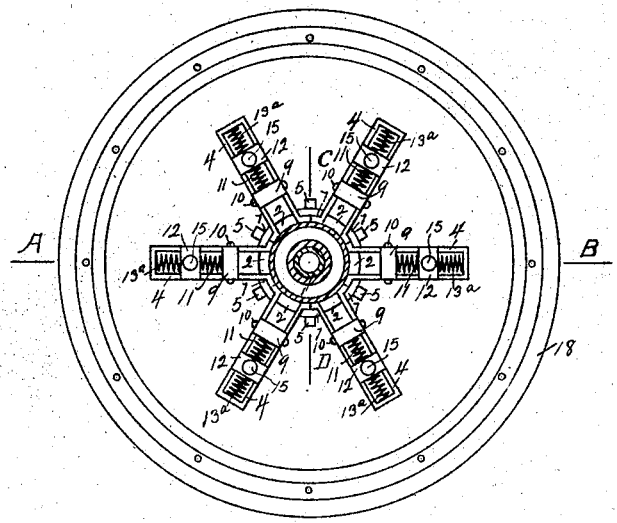
Fig.1.
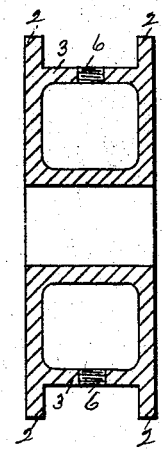
Fig.2.
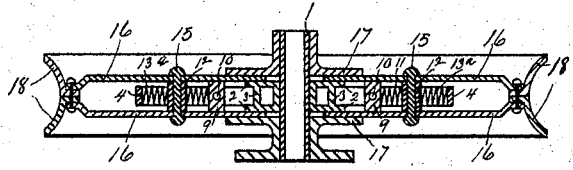
Fig.5.
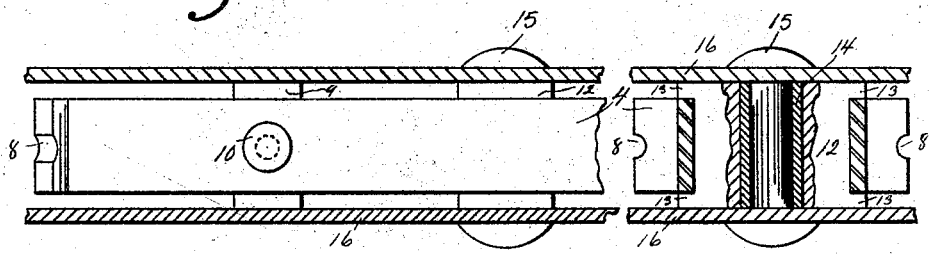
Fig.3.
Fig.4.
WITNESS:
Bertha Falk
INVENTOR.
LOUIS. FREDRICK  . JANKE.
BY
Charles Albert French.
ATTORNEY.

Patented Sept. 5, 1922.

1,428,034

UNITED STATES PATENT OFFICE.

LOUIS FREDRICK JANKE, OF MADISON, WISCONSIN.

FLOATING-HUB METAL WHEEL.

Application filed March 8, 1922. Serial No. 542,129.

*To all whom it may concern:*

Be it known that I, LOUIS FREDRICK JANKE, a citizen of the United States, residing at Madison, in the county of Dane and State of Wisconsin, have invented certain new and useful Improvements in Floating-Hub Metal Wheels, of which the following is a specification.

My invention relates to floating hub metal wheels; and the objects of my invention are, first, an all metal wheel; second, a wheel in which the outer walls provide an oil reservoir for lubricating the inner resilient members; and third, a wheel in which the hub and spokes are connected to the outer rim by springs in such a manner that the hub floats, or is suspended on resilient means in all positions.

I attain these objects by the mechanism shown in the accompanying drawings in which—

Fig. 1, is a side elevation partly in section, with one side wall removed;

Fig. 2, is a horizontal section on line A—B Fig. 1;

Fig. 3, is a side elevaton of flexible spoke, and cross section of side casings;

Fig. 4, is a cross section of spoke and casing and plan of sliding block broken away at the center, showing the anchor pin;

Fig. 5, is a cross section of the hub on line C—D Fig. 1.

Similar numerals refer to similar parts throughout the several views.

The hub comprises a horizontal tubular bearing 1, with vertical discs 2, spaced apart by an annular band 3, the whole cast in one piece. A plurality of spokes 4, constructed of spring steel bent backward upon itself in parallel alignment spaced apart a distance and terminating in outwardly projecting bases, are disposed around the annular band of the hub and secured to same by screws 5, threaded to holes 6 in the band, and passing through cap plates 7, and semi circular notches 8 in the base of the spokes. Bridges 9, secured between the two sides of the spokes by rivets 10, are located a distance up from the base and secure the sides in parallel alignment, and provide a seat for the lower ends of compression spiral springs 11.

Sliding blocks 12, with side flanges 13, are slidably disposed between the two arms of the spokes, the lower sides resting upon the upper ends of the springs 11, and the upper sides engaging spiral springs 13ª, located between the blocks and the outer ends of the spokes, a hole is drilled centrally crosswise of the blocks and sleeves 14, are loosely located therein, adapted to receive bolts or rivets 15, to secure the two outside plates 16, to the sleeves. The plates 16, are provided with central openings larger than the hub bearing 1, and are located on the outside of the discs 2, in sliding contact therewith, and secured in such position by the hub flanges 17, which are located contiguous the outsides of the plates and extend to the ends of the hub bearing 1, thereby slidably holding the plates against the hub discs. The bolts or rivets 15, are the means for connecting the plates 16, to the hub bearing 1, utilizing the resiliency of the spokes 4, the spiral springs 11 and 13, through the sliding block 12, a rim 18, secured to the outer edges of the plates 16, by rivets 19, serves for attaching a tire of solid rubber or any desired material, and also completes the oil reservoir for lubricating the spring members. Upon reference to Fig. 1, it will be seen that the bearing hub 1, at all times floats upon the flexibility and resiliency of the spokes in combination with the spiral springs 11 and 13, each side of the sliding blocks 12, and thereby prevent injury to the axles from sudden jolts over rough roads, or resistance to the wheels from any cause.

Having thus described my invention, I claim.

In a metal wheel, a central hub, bifurcated radial spring spokes secured to the hub, bridges secured in the spokes, blocks slidably disposed in the spokes between the bridges and outer ends thereof, spiral springs located in the spokes between the bridges and blocks, and between the blocks and the outer ends of the spokes, an oil tight outer casing adapted to carry a tire, slidably attached to the hub, and secured to the blocks by sleeves and bolts or rivets.

In testimony whereof I affix my signature in the presence of two subscribing witnesses.

LOUIS FREDRICK JANKE.

Witnesses:
O. C. HAHN,
E. A. JANKE.